US008858395B2

(12) United States Patent
Li

(10) Patent No.: US 8,858,395 B2
(45) Date of Patent: Oct. 14, 2014

(54) TORQUE CONTROL SYSTEM

(75) Inventor: Wei Li, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 13/459,873

(22) Filed: Apr. 30, 2012

(65) Prior Publication Data

US 2013/0288856 A1 Oct. 31, 2013

(51) Int. Cl.
*F16H 59/48* (2006.01)
*B60W 10/06* (2006.01)

(52) U.S. Cl.
USPC .......................................... 477/120; 701/54

(58) Field of Classification Search
USPC ............ 477/52, 68, 115, 120; 180/53.4, 53.7, 180/53.8; 701/50, 54
See application file for complete search history.

(56) References Cited

U.S. PATENT DOCUMENTS

| | | | |
|---|---|---|---|
| 4,582,141 A * | 4/1986 | van der Lely | 172/3 |
| 5,413,540 A | 5/1995 | Streib et al. | |
| 5,575,737 A | 11/1996 | Weiss | |
| 6,385,970 B1 | 5/2002 | Kuras et al. | |
| 8,321,114 B2 * | 11/2012 | Kamado et al. | 701/84 |
| 8,532,884 B2 * | 9/2013 | Saito et al. | 701/50 |
| 2007/0219693 A1 * | 9/2007 | Stratton et al. | 701/50 |
| 2008/0103019 A1 | 5/2008 | Cronin et al. | |
| 2009/0088295 A1 | 4/2009 | Dahl et al. | |
| 2009/0112414 A1 * | 4/2009 | Eastman et al. | 701/54 |
| 2010/0161186 A1 | 6/2010 | Quinn et al. | |
| 2012/0177470 A1 * | 7/2012 | Ohhigashi et al. | 414/687 |
| 2012/0310494 A1 * | 12/2012 | Asami et al. | 701/50 |

FOREIGN PATENT DOCUMENTS

WO WO 2010/059082 5/2010
WO WO2011115600 A1 * 11/2011

* cited by examiner

*Primary Examiner* — Roger Pang
(74) *Attorney, Agent, or Firm* — Finnegan, Henderson, Farabow, Garrett & Dunner LLP

(57) ABSTRACT

A method of controlling a machine includes receiving a torque demand associated with at least one of a first parasitic load and a second parasitic load. At least the first parasitic load receives power from a power source of the machine via a transmission coupled to the power source. The method also includes providing torque from the power source to the at least one of the first and second parasitic loads in response to receiving the torque demand. In such a method wherein torque is provided to the at least one of the first and second parasitic loads based on a torque priority value associated with the at least one of the first and second parasitic loads. In addition, the torque priority value is adjustable by an operator of the machine during operation of the machine.

20 Claims, 3 Drawing Sheets

TORQUE CONTROL SYSTEM

TECHNICAL FIELD

This disclosure relates generally to a control system and, more particularly, to a system and method of controlling torque distribution between parasitic loads.

BACKGROUND

Machines such as, for example, wheel loaders, track type tractors, and other types of heavy machinery can be used for a variety of tasks. These machines include a power source, which may be, for example, an engine, such as a diesel engine, gasoline engine, or natural gas engine that provides the power required to complete such tasks. Such power is directed to various tools, implements, pumps, fans, and/or other like parasitic loads to assist in performing these tasks. In addition, to effectively maneuver the machines during performance of such tasks, the machines include a transmission that is capable of transmitting power generated by the engine to various drivetrain components of the machines over a wide range of conditions.

For example, such machines commonly use a continuously variable transmission ("CVT") to direct engine torque to traction devices, such as wheels or tracks, that propel the machine. A CVT is capable of providing an output torque to such components, at any speed within its operating range, by continuously changing the ratio of the transmission. During some operations, the engine and/or the CVT may also be used to assist in braking the machine. For example, during operations in which the machine is required to change travel directions at relatively high load, the engine and the CVT may be configured to provide a retarding torque to the traction devices in order to stop the machine.

However, in some situations the torque required to satisfy the cumulative demand of such machine components exceeds the maximum torque output of the engine. For example, in situations where the traction devices and one or more hydraulic implements of the machine each require large amounts of torque to perform respective tasks, the cumulative torque demand associated with these components may be greater than the maximum engine torque available for distribution. In such situations, known control systems typically distribute the available engine torque according to distribution rules stored in one or more look-up tables, or by using fixed torque priority values or ratios associated with the respective components.

For example, U.S. Pat. No. 6,385,970 to Kuras et al. discloses a system that includes an engine, a hydraulic CVT, and a control system in communication with the engine and the CVT. The control system of the '970 patent is paired with a hydro-mechanical drive system that is operable to sense engine speed and create an output speed signal. The control system is further operable to compare the engine speed signal to an underspeed value and produce an error signal. The error signal is used to produce a command signal that controls the transmission ratio to manage the parasitic loads receiving power from the engine.

While the control system of the '970 patent may employ various strategies to distribute engine torque including the use of look-up tables or fixed torque priority values associated with the parasitic loads, such strategies are inflexible and are typically disliked by operators of such machines. For example, preferences for optimal torque distribution between machine implements and the traction devices may vary from operator to operator. Thus, while a certain torque distribution between such components may be acceptable to a first operator of the machine, the same torque distribution may be unacceptable to a second operator of the machine. Systems similar to the control system disclosed in the '970 patent, however, do not allow operators to manually adjust the torque priority values associated with the respective machine components during operation. As a result, such systems do not allow for machine optimization based on the individual preferences of the operator.

The present disclosure is directed towards overcoming one or more of the problems as set forth above.

SUMMARY OF THE INVENTION

In an exemplary embodiment of the present disclosure, a method of controlling a machine includes receiving a torque demand associated with at least one of a first parasitic load and a second parasitic load. At least the first parasitic load receives power from a power source of the machine via a transmission coupled to the power source. The method also includes providing torque from the power source to the at least one of the first and second parasitic loads in response to receiving the torque demand. In such a method wherein torque is provided to the at least one of the first and second parasitic loads based on a torque priority value associated with the at least one of the first and second parasitic loads. In addition, the torque priority value is adjustable by an operator of the machine during operation of the machine.

In another exemplary embodiment of the present disclosure, a method of controlling a machine includes determining a first cumulative torque demand associated with a traction device of the machine and an implement of the machine. The method also includes determining that the first cumulative torque demand exceeds a maximum power source torque, and providing torque from a power source of the machine to the traction device and the implement in response to determining that the first cumulative torque demand exceeds the maximum power source torque. In such a method, torque is provided to the traction device and the implement based on a first torque priority value associated with the traction device and a second torque priority value associated with the implement. The method also includes adjusting at least one of the first and second torque priority values based on an input received from an operator of the machine. The method further includes providing torque from the power source to the traction device and the implement based on the adjusted at least one of the first and second torque priority values.

In a further exemplary embodiment of the present disclosure, a machine includes a power source, a transmission operably connected to the power source, and first and second parasitic loads receiving power from the power source. At least the first parasitic load receives power from the power source via the transmission. The machine also includes an operator interface associated with the first and second parasitic loads, and a control system in communication with the power source, the transmission, the first and second parasitic loads, and the operator interface. The control system is operable to receive a torque demand associated with at least one of the first and second parasitic loads, and to receive an input from the operator interface indicative of a torque priority value associated with the at least one of the first and second parasitic loads. The control system is also operable to direct the power source to provide torque to the at least one of the first and second parasitic loads in response to receiving the torque demand. Torque is provided to the at least one of the first and second parasitic loads based on the torque priority value.

DETAILED DESCRIPTION

Figure 1:
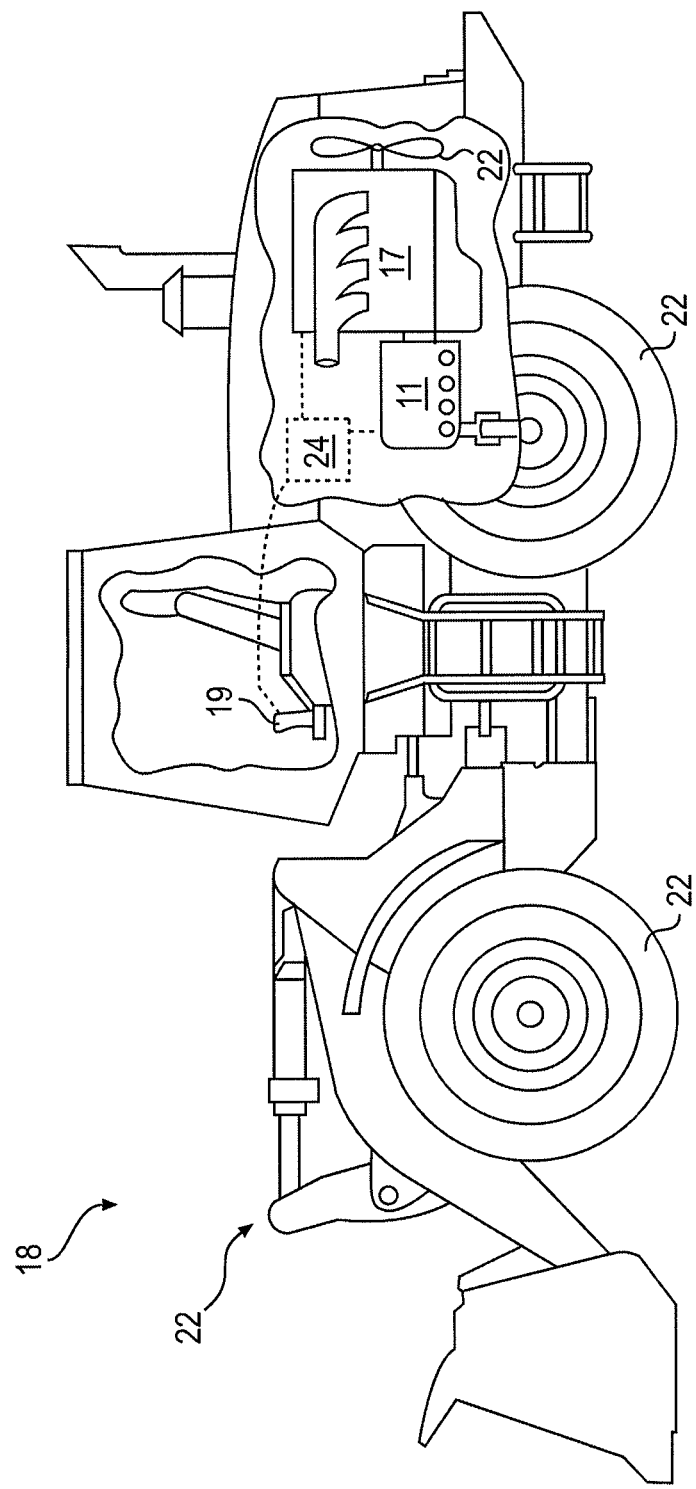
FIG. 1 illustrates a partial cut-away view of a machine according to an exemplary embodiment of the present disclosure.

FIG. 1 illustrates a machine 18 according to an exemplary embodiment of the present disclosure. Such a machine 18 may be, for example, any mobile or stationary machine used to perform work or other tasks. Such exemplary machines 18 may include, but are not limited to, wheel loaders, motor graders, track-type tractors, excavators, power generators, on-highway vehicles, off-highway vehicles, and/or other like equipment. Such machines 18 may be used to perform tasks in, for example, mining, excavating, construction, farming, transportation, and/or other like environments or applications. As shown in FIG. 1, such a machine 18 may include, among other things, a power source 17, a transmission 11 operably connected to the power source 17, and one or more parasitic loads 22.

The power source 17 may comprise, for example, an engine, such as an internal combustion engine. The engine may be a diesel engine, a gasoline engine, a natural gas engine, or any other engine readily apparent to one skilled in the art. In additional exemplary embodiments, the power source 17 may comprise any type of known electric or hybrid-electric power source such as, for example, a fuel cell.

Figure 2:
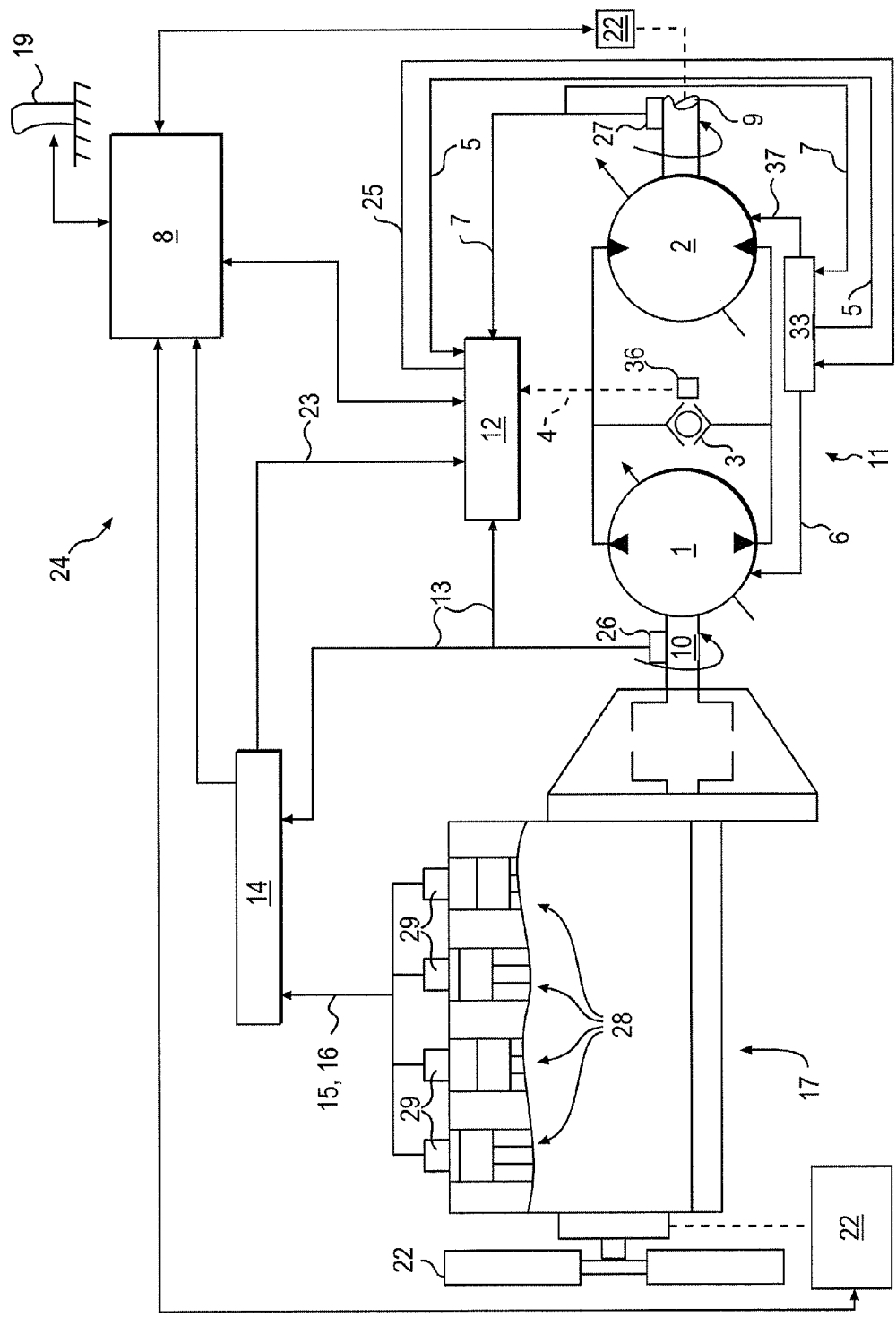
FIG. 2 is a schematic illustration of an exemplary control system associated with the machine shown in FIG. 1.

As illustrated in FIG. 2, the power source 17 may include a plurality of combustion chambers 28, and a fuel injector 29 may be associated with each combustion chamber 28. In the illustrated embodiment, the power source 17 includes four combustion chambers 28 and four associated fuel injectors 29. One skilled in the art will readily recognize, however, that power source 17 may include a greater or lesser number of combustion chambers 28, and that combustion chambers 28 may be disposed in an "in-line" configuration, a "V" configuration, or any other conventional configuration.

The power source 17 may be configured to provide an output torque to the transmission 11, the parasitic loads 22, and/or other components of the machine 18 across a range of power source speeds. For example, the power source 17 may be configured to provide output torque to one or more components of the machine 18 via the transmission 11. Such output torque may be transmitted from the power source 17 to transmission 11, and from the transmission 11 to such machine components, to assist in performing the various tasks described herein. For example, one or more of the parasitic loads 22 may receive power from the power source 17 via the transmission 11. Additionally, one or more of the parasitic loads 22 may receive power from the power source 17 directly (i.e., through one or more linkages or couplings connected to an output of the power source 17 and without interfacing with the transmission 11).

As shown in FIG. 1, such parasitic loads 22 may include, for example, the wheels, tracks, and/or other traction devices of the machine 18. The parasitic loads 22 may also include, for example, one or more hydraulic motors, pumps, cylinders, fans, and/or other machine components used in performing work. Such parasitic loads 22 may, for example, assist in maneuvering, accelerating, braking, and/or otherwise moving the machine 18 during use. Such parasitic loads 22 may also, for example, assist in power source cooling as well as raising, lowering, turning, moving and/or otherwise operating one or more arms, booms, buckets, graders, augers, tools, implements, and/or other machine components.

With continued reference to FIG. 2, an input drive member such as, for example, a countershaft 10 may connect the power source 17 to the transmission 11 at an interface between the power source 17 and the transmission 11. The transmission 11 may also include an output driven member such as, for example, an output shaft 9. As described in greater detail below, the transmission 11 may convert an input rotation of countershaft 10 into an output rotation of output shaft 9. In this manner, power and/or torque generated by the power source 17 may be transmitted to the output shaft 9, and the output shaft 9 may transmit such power and/or torque to one or more parasitic loads 22, such as the various traction devices of the machine 18.

In additional exemplary embodiments, the transmission 11 may be configured to provide an input rotation of the countershaft 10 to the power source 17, thereby transmitting input power and/or torque to the power source 17. In exemplary embodiments, such input power and/or torque provided to the power source 17 by the transmission 11 may be used to assist in braking the machine 18. It is understood that the transmission 11 may comprise any known type of transmission, and in some exemplary embodiments, such as embodiments in which the transmission 11 is configured to provide power and/or torque to the power source 17, the transmission 11 may comprise a CVT. As shown in FIG. 2, the transmission 11 may be a hydraulic CVT. Alternatively, in additional exemplary embodiments, the transmission 11 may be an electric CVT or other type of CVT apparent to one skilled in the art.

A CVT generally consists of a driving element, a driven element, and a ratio controller 33. In the hydraulic CVT illustrated in FIG. 2, the driving element may be a pump 1, such as a variable displacement pump, and the driven element may be a motor 2, such as a variable displacement motor. In an electric CVT, on the other hand, the driving element may be an electric generator and the driven element may be an electric motor.

In the hydraulic CVT of FIG. 2, the ratio controller 33 may be configured to manipulate the displacement of the pump 1 with a pump command signal 6, and may be configured to manipulate the displacement of the motor 2 with a motor command signal 37. By manipulating displacements in this way, the ratio controller 33 may vary and/or otherwise control the output rotation of output shaft 9. The motor 2 may be fluidly connected to the pump 1 by conduits that supply and return fluid to and from the pump 1 and motor 2. As a result, the pump 1 may be configured to drive the motor 2 by fluid pressure. The transmission 11 may also include a resolver 3, allowing for a measurement of a pressure differential between the two conduits of supply and return fluid. The pressure differential between the two conduits and/or the displacement of the motor 2 may be used to determine an output torque of the transmission 11.

The ratio controller 33 may also be configured to control the ratio of the transmission output speed to the transmission input speed. In the exemplary embodiment shown in FIG. 2, the ratio controller 33 may be in communication with both the driving element and the driven element, and may adjust the ratio of the transmission output speed to the transmission input speed, as limited by the power output of the power source 17. When both output torque and output speed increases are demanded of the transmission 11, a demand for increased power is transmitted to the power source 17 by the ratio controller 33. Likewise, when both output torque and output speed decreases are demanded of the transmission 11, a demand for decreased power is transmitted to the power source 17.

The ratio of transmission output speed to transmission input speed, at a particular power source output power, may be controlled by manipulating the displacement of the pump 1 and motor 2. As the machine 18 encounters a relatively rapid change in loading conditions such as, for example, a change from a high ground speed with a low load to a low ground speed with a high load, the ratio controller 33 may shift the ratio of the transmission 11 from a high speed output to a low speed output. It is understood that such a relatively rapid change in loading conditions may occur, for example, upon driving the machine 18 into a pile of material with an empty bucket, lifting the bucket loaded with material, and backing the machine 18 away from the pile of material in a reverse direction. When shifting from a high speed output to a low speed output, the ratio controller 33 may decrease the flow of fluid supplied to the motor 2 by decreasing the displacement of the pump 1 to reduce the torque load or power load of the power source 17. The ratio controller 33 may also increase the displacement of the motor 2 to decrease the load on the power source 17. If the machine 18 encounters a reduction in load, the ratio controller 33 may increase the displacement of the pump 1 and may decrease the displacement of the motor 2. The increased displacement of the pump 1 combined with the decreased displacement of the motor 2 results in an increase in machine travel speed and a reduction in the available torque.

Alternatively, in an electric CVT, the ratio of transmission output speed to input speed, at a particular power source output power, may be controlled by manipulating a torque command signal to the electric motor described above. As the machine 18 encounters a relatively rapid change in loading conditions such as, for example, changing from a high ground speed with a low load to a low ground speed with a high load, the ratio controller 33 may alter the torque command signal sent to the electric motor to produce additional torque. In turn, the electric motor may demand additional power capacity from the generator described above in the form of additional current.

FIG. 2 also illustrates an exemplary control system 24 of the machine 18. The control system 24 may be used, for example, with the power source 17, the transmission 11, and/or with the one or more parasitic loads 22 associated with the machine 18. In exemplary embodiments, the control system 24 may responsively and/or otherwise adaptively control the output torque provided by the power source 17 to one or more of the parasitic loads 22 based on a torque demand received from at least one of the parasitic loads 22. As used herein, the term "torque demand" may be defined as and/or may otherwise be indicative of for example, a torque required by a parasitic load 22 to perform a desired task. Such a torque demand may be employed by the control system 24 to direct and/or otherwise control operation of the power source 17. For example, the power source 17 may be directed by the control system 24 to generate and/or otherwise provide an output torque sufficient to satisfy the torque demand. In exemplary embodiments, the control system 24 may calculate and/or otherwise determine a cumulative torque demand based on individual respective torque demands received from the parasitic loads. Such a cumulative toque demand may be determined by summing the torque demands or by, for example, entering the torque demands into one or more cumulative torque demand algorithms.

It is understood that in certain situations, more than one of the parasitic loads 22 may be operated substantially simultaneously. For example, an operator may direct the machine 18 to move relative to a pile of material while substantially simultaneously directing one or more hydraulic cylinders to raise a bucket of the machine 18 that has been loaded with the material. In such an exemplary operation, for example, the traction devices and the one or more hydraulic cylinders of the machine 18 may each send respective torque demands to the control system 24. In such embodiments, the torque demand may comprise a cumulative torque demand. As used herein, the term "cumulative torque demand" may be defined as, and/or may otherwise be indicative of torque substantially simultaneously required by two or more parasitic loads 22 of the machine 18. For example, the cumulative torque demand may be indicative of the total torque substantially simultaneously required by the parasitic loads 22 receiving power from the power source 17. The cumulative torque demand may be employed by the control system 24 to direct and/or otherwise control operation of the power source 17 and, in exemplary embodiments, the control system 24 may direct the power source 17 to generate and/or otherwise provide an output torque sufficient to satisfy the cumulative torque demand.

As shown in FIG. 2, one or more sensors may be associated with the transmission 11, the power source 17, and/or the parasitic loads 22. These sensors may be configured to generate signals indicative of one or more operating characteristics of the machine 18, and such operating characteristics may be associated with, for example, the transmission 11, the power source 17, and/or the parasitic loads 22, respectively. For example, in the hydraulic transmission 11 of FIG. 2, a pressure sensor 36 may be configured to provide a fluid pressure signal 4 from the resolver 3 to a transmission controller 12 associated with the control system 24. In addition, a power source speed sensor 26 may be configured to produce a power source speed signal 13, and a transmission speed sensor 27 may be configured to produce a transmission speed signal 7. The speed sensors 26, 27 may be, for example, in the form of magnetic pick-up sensors configured to produce signals corresponding to the rotational speeds of the countershaft 10 and the output shaft 9, respectively. These sensors 26, 27 may also be capable of determining the angular position and/or direction of rotation of the countershaft 10 and output shaft 9. The speed sensors 26, 27 may provide the respective signals to the transmission controller 12 and/or to a power source observer 14 associated with the control system 24. Additionally, although not illustrated in FIG. 2, in exemplary embodiments of the present disclosure one or more sensors associated with the machine 18 may be configured to determine operating characteristics including, for example, a transmission gear, the ratio of transmission output speed to transmission input speed, a travel direction of the machine 18, and/or other like operating characteristics. Such additional sensors may comprise, for example, a throttle position sensor, a position sensor associated with a forward-neutral-reverse lever of the machine 18, and/or other like sensors associated with the machine 18 and/or operator interfaces 19 thereof. In exemplary embodiments, such operator interfaces 19 may include, for example, one or more knobs, levers, dials, switches, buttons, keypads, touch screens, and/or other like controls configured to enable an operator of the machine 18 to manually adjust one or more operating characteristics of the machine 18.

In addition to the operating characteristics described above, such operating characteristics may further include a torque priority value associated with one or more of the parasitic loads 22. As used herein, the term "torque priority value" may be defined as and/or may otherwise be indicative of, for example, a weighing factor, a bias, and/or other algorithm term assisting in governing a percentage of torque allocated to a respective machine component and/or parasitic load 22. In exemplary embodiments, each torque priority value may comprise an algorithmic gain on which the distribution of torque provided by the power source 17 is based. The respective torque priority values associated with the various parasitic loads 22 may be manually adjusted by the operator via one or more of the operator interfaces 19 during operation of the machine 18.

For example, when the machine 18 is operating at relatively low travel speeds and relatively high loads, such as when the machine 18 begins to travel in a reverse direction away from a pile with a fully-loaded bucket of material, an operator may prefer that the torque priority value of the bucket be relatively greater than the torque priority value of the traction devices. By manipulating one or more of the operator interfaces 19, the operator may adjust the relative torque priority values of the bucket and the traction devices, during operation of the machine, to suit his or her preferences. Additionally, after emptying the bucket of material, the operator may again manipulate the one or more operator interfaces 19 to increase the torque priority value of the traction devices relative to the bucket. Such adjusted torque priority values may assist the operator in returning to the pile more quickly at low load.

In the exemplary embodiments described herein, the operator interfaces 19 may be configured to direct one or more signals to the control system 24 in response to movement thereof. Such signals may comprise inputs to the control system 24 received from the operator of the machine 18. In such embodiments, the signals and/or inputs may be indicative of a desired torque priority value associated with one or more of the parasitic loads 22. For example, inputs received via the one or more operator interfaces 19 may be indicative of a desired ratio between a first torque priority value associated with a first parasitic load 22 and a second torque priority value associated with a second parasitic load 22. With reference to the exemplary bucket and traction devices described above, for example, an operator may manually adjust the ratio between the torque priority value associated with the bucket and the torque priority value associated with the traction devices during operation of the machine 18, in response to changing task requirements, to maximize operational efficiency. In exemplary embodiments, such a ratio may be indicative of the distribution of power source torque between the various parasitic loads 22.

In exemplary embodiments, the torque priority values associated with the parasitic loads 22 may be indicative of respective percentages of a maximum power source torque allocated to the parasitic loads 22. As used herein, the term "maximum power source torque" may be defined as and/or may otherwise be indicative of a peak torque capable of being provided by the power source 17. Such a maximum power source torque may vary depending on the capacity, configuration, and/or other characteristics of the power source 17. In exemplary embodiments, such a maximum power source torque may be between approximately 1400 Nm and approximately 1800 Nm. Moreover, such a maximum power source torque may be achieved while operating the power source 17 at a speed between approximately 1000 rpm and approximately 1500 rpm.

For example, if the maximum power source torque of an exemplary power source 17 is assumed to be approximately 1600 Nm, exemplary torque priority values associated with the various parasitic loads 22 may be indicative of respective percentages of this maximum torque value allocated to the parasitic loads 22. For example, in such an embodiment a 55 percent torque priority value associated with the traction devices may result in approximately 880 Nm of torque (out of the maximum power source torque of approximately 1600 Nm) being allocated to the traction devices while a corresponding 45 percent torque priority value associated with the bucket may result in approximately 720 Nm of torque being allocated to the bucket. It is understood that in operating conditions in which a cumulative torque demand associated with the parasitic loads 22 exceeds the maximum power source torque, the control system 24 may direct the power source 17 to provide torque to the various parasitic loads 22 based on their respective torque priority values. If, on the other hand, the cumulative torque demand does not exceed the maximum power source torque (i.e., the power source 17 is capable of satisfying the cumulative torque demand), the control system 24 may direct the power source 17 to provide torque to the parasitic loads 22 based on their respective torque demands.

It is also understood that adjusting a torque priority value associated with a first parasitic load 22 may result in a corresponding adjustment to respective torque priority values associated with second, third, and/or other parasitic loads 22 of the machine 18. For example, if the maximum power source torque is assumed to be approximately 1600 Nm, and two parasitic loads 22 substantially simultaneously request torque from the power source 17, increasing a torque priority value associated with the first parasitic load 22 from 45 percent to 55 percent may result in a corresponding decrease in a torque priority value associated with the second parasitic load 22 from 55 percent to 45 percent.

In still further exemplary embodiments, the torque priority values described herein may be adjustable within respective torque priority value ranges. For example, the torque priority value associated with each respective parasitic load 22 may be adjustable within a percentage and/or other range of the maximum power source torque. In an exemplary embodiments, each torque priority value may be adjustable within a priority value range between approximately 30 percent of the maximum power source torque and approximately 70 percent of the maximum power source torque. For example, if the maximum power source torque is assumed to be approximately 1600 Nm, the torque priority value associated with the traction devices may be adjustable between approximately 30 percent and approximately 70 percent of this maximum torque value, thereby resulting in a torque allocation of between a minimum of approximately 480 Nm and a maximum of approximately 1120 Nm to the traction devices. As described above, adjusting the torque priority value associated with the traction devices may result in a corresponding adjustment to the torque priority value associated with, for example, the bucket and/or other parasitic loads 22 of the machine 18. By limiting adjustment of the torque priority values in this way, the control system 24 may assist in minimizing and/or eliminating damage to the various parasitic loads 22 caused by, for example, directing torque to the parasitic load 22 in excess of their respective maximum torque levels.

With continued reference to FIG. 2, it is understood that the power source observer 14 and the transmission controller 12 may be operably connected and/or otherwise in communication with each other. Additionally, the transmission controller 12 and the power source observer 14 may be operably connected to and/or otherwise in communication with a machine controller 8 of the control system 24. Although FIG. 2 illustrates the transmission controller 12, the power source observer 14, and the machine controller 8 as being separate components of the control system 24, in additional exemplary embodiments, the transmission controller 12, the power source observer 14, and/or the machine controller 8 may be combined into and/or may otherwise embody a single controller, microprocessor, and/or other known control component. Numerous commercially available microprocessors can be configured to perform the functions of the controller 12, the power source observer 14, and the machine controller 8. One or more of the controller 12, the power source observer 14, and the machine controller 8 may comprise memory and/or other storage components configured to retain data maps, look-up tables, algorithms, programs, sensed operating characteristics, and/or other information used to operate the machine 18 and/or the control system 24.

In exemplary embodiments, the control system 24 may use observed and/or otherwise determined operating characteristics, and/or signals received from one or more of the sensors and/or operator interfaces 19 described herein, to determine one or more parameters associated with the transmission 11, the power source 17, the parasitic loads 22, and/or the machine 18. Such parameters may include but are not limited to, for example, an output torque generated by the power source 17, an output torque generated by the transmission 11, a power loss associated with the transmission 11, and/or the cumulative torque demand described above. The machine parameters described herein may be determined in an open-loop or a closed-loop manner by the control system 24. Such parameters may be used, either alone or in conjunction with the operating characteristics described above, to assist in, for example, maneuvering the machine, operating the parasitic loads 22, and/or otherwise controlling the transmission 11, the power source 17, the parasitic loads 22, and/or other machine components. For example, the components of the control system 24 may be configured to assist in distributing torque from the power source 17 between the parasitic loads 22 based on the torque demand, cumulative torque demand, maximum power source torque, torque priority values, and/or other operating characteristics or machine parameters described herein.

In exemplary embodiments, the power source observer 14 may be configured to monitor one or more operating characteristics of the power source 17 and/or to receive signals indicative of one or more operating characteristics. For example, the power source observer 14 may receive the power source speed signal 13 described above with respect to power source speed sensor 26. In addition, the power source observer 14 may monitor the operation of the fuel injectors 29 through a power source fuel setting signal 15 and a power source fuel injection timing signal 16. Such signals may be provided to the power source observer 14 via one or more sensors (not shown) associated with the fuel injectors 29. In exemplary embodiments, the power source observer 14 may use one or more such inputs to estimate, calculate, and/or otherwise determine the output torque generated by the power source 17. In exemplary embodiments, the output torque of the power source 17 may also be determined based on, among other things, ambient temperature, ambient humidity, power source load, machine travel speed, and/or other known parameters. The determined power source torque may be sent to the transmission controller 12 via a torque signal 23. Additionally, the power source speed, power source torque, and or other operating characteristics or determined parameters may be sent from the power source observer 14 to the machine controller 8. It is understood that signals, data, and/or information indicative of the operating conditions and machine parameters described herein may be communicated between the power source observer 14, the transmission controller 12 and the machine controller 8 wirelessly and/or via one or more known connections. It is also understood that the power source torque and/or other operating characteristics or machine parameters described herein may be used by the control system 24 to assist in distributing torque from the power source 17 between the parasitic loads 22 and/or to assist in adjusting one or more of the torque priority values.

The transmission controller 12 may be configured to monitor any of the operating characteristics described herein and/or to receive signals indicative of one or more operating characteristics of the transmission 11 and/or the parasitic loads 22. For example, the transmission controller 12 may be configured to receive inputs including the transmission speed signal 7 from speed sensor 27, a pump and motor displacement signal 5 from ratio controller 33, and the fluid pressure signal 4 from pressure sensor 36. The transmission controller 12 may also receive the power source speed signal 13 discussed above with respect to the power source speed sensor 26, and the torque signal 23 generated by the power source observer 14. In exemplary embodiments in which the transmission 11 comprises an electric CVT, the transmission controller 12 may also be configured to receive inputs including, for example, a torque command signal from ratio controller 33, and the transmission speed signal 7 from transmission speed sensor 27. The transmission controller 12 may determine one or more parameters of the machine 18, the parasitic loads 22, and/or the transmission 11 based on such inputs, and may generate one or more control commands based on the determined parameters. For example, the transmission controller 12 may determine an output torque of the transmission 11 exerted on countershaft 10, through one or more torque algorithms, using the pump and motor displacement signal 5, the fluid pressure signal 4, the power source speed signal 13, and/or the torque signal 23 as algorithm inputs. Such an output torque may be used by the control system 24 to assist in distributing torque from the power source 17 via the transmission 11, and/or to assist in adjusting one or more of the torque priority values.

The machine controller 8 may be configured to monitor any of the operating characteristics described herein and/or to receive signals indicative of one or more operating characteristics of the transmission 11, the power source 17, and/or the parasitic loads 22. For example, the machine controller 8 may be configured to receive inputs including the transmission speed signal 7 from speed sensor 27 and/or from the transmission controller 12. The machine controller 8 may also receive a signal generated by the transmission controller 12 indicative of the transmission output torque. In addition, the machine controller 8 may receive one or more signals generated by the power source observer 14. Such signals may be indicative of, for example, the power source output torque and/or the power source speed. In further exemplary embodiments, the machine controller 8 may receive the power source speed signal 13 from the power source speed sensor 26. In addition, the machine controller 8 may receive one or more signals from the respective parasitic loads 22, sensors, and/or operator interfaces 19. Such signals may contain information indicative of, for example, a fluid pressure, a load, and/or a torque demand associated with the respective parasitic load 22. For example, the machine controller 8 may be in communication with one or more of the parasitic loads 22, and may receive a respective torque demand from each parasitic load 22 directly. The machine controller 8 may also receive signals indicative of for example, the ratio of transmission input speed to transmission output speed, a gear of the transmission, a travel direction of the machine, and/or any of the other operating characteristics described herein.

The machine controller 8 may determine one or more parameters of the machine, the parasitic loads 22, the power source 17, and/or the transmission 11 based on such inputs, and may generate one or more control commands based on the determined parameters. For example, the machine controller 8 may determine the cumulative torque demand based on each of the respective torque demands received from the parasitic loads 22. Such a cumulative torque demand may then be used to control the torque output by the power source 17. Additionally, the machine controller 8 may compare the one or more torque demands and/or the cumulative torque demand to the maximum power source torque. As will be described below, the machine controller 8 may assist in allocating torque to the respective parasitic loads 22, based on their respective torque priority values, in response to determining that the cumulative torque demand exceeds the maximum power source torque.

Industrial Applicability

The disclosed systems and methods have wide applications in a variety of machines including, for example, wheel loaders and track-type tractors. The disclosed systems and methods may be implemented into any machine that utilizes a transmission to convert rotational speed of a power source into a drive speed for a traction device. For example, the disclosed systems and methods may be used by any machine employing a power source, a CVT, and/or one or more parasitic loads. Such parasitic loads may receive power from the power source in order to perform a variety of tasks, and may be operable to assist in machine propulsion and braking.

Figure 3:
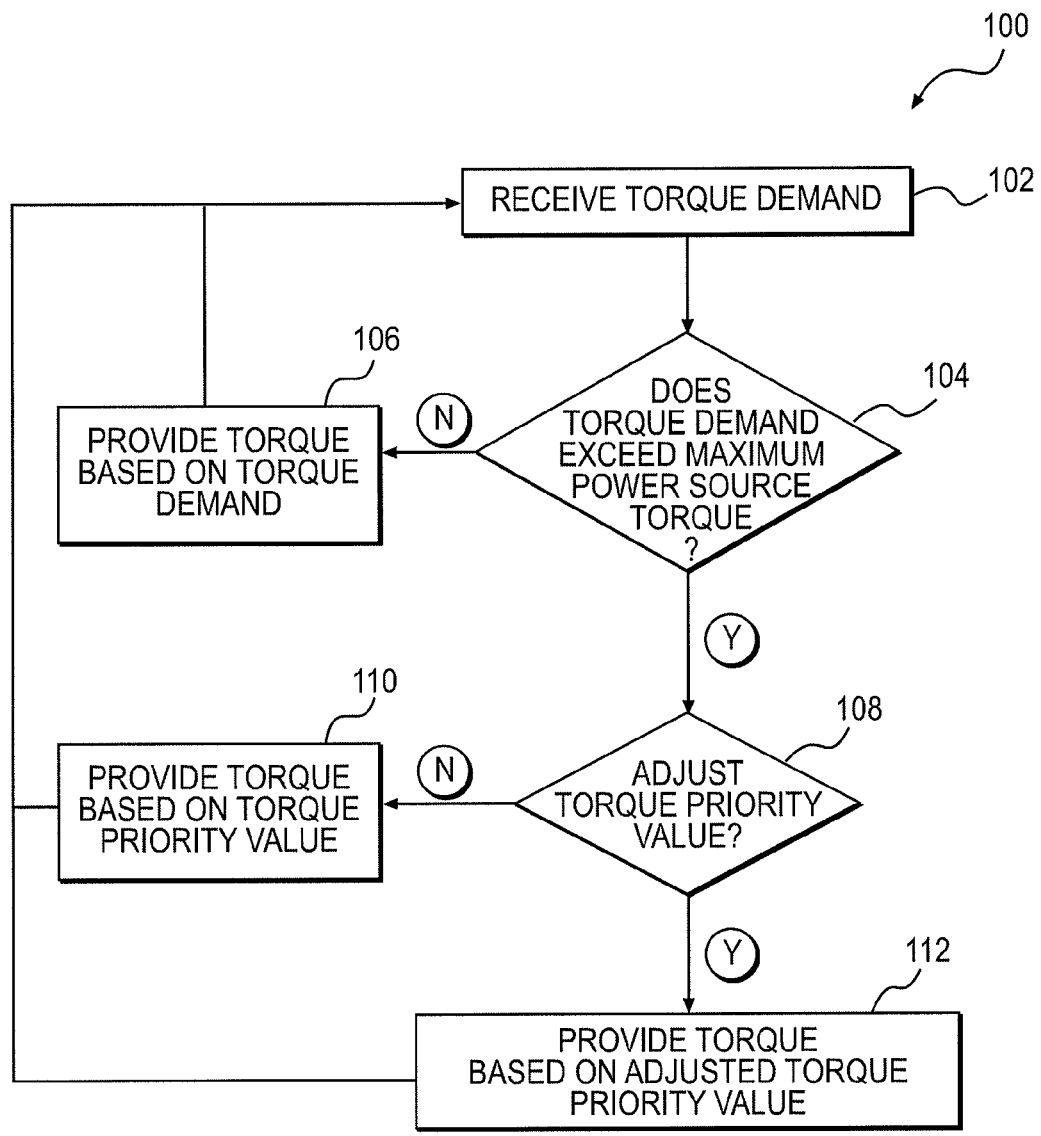
FIG. 3 is a flow chart illustrating an exemplary method of controlling a machine.

During an exemplary machine operation, it may be necessary to move the machine 18 from a first location to a second location and/or to otherwise operate one or more of the parasitic loads 22 of the machine 18. As shown in the flow chart 100 of FIG. 3, during such exemplary operations, a method of controlling the transmission 11, the power source 17, and/or the parasitic loads 22 may include receiving a torque demand associated with at least one of the parasitic loads 22 (Step: 102). For example, an operator of the machine 18 may manipulate one or more of the operator interfaces 19 to control various machine operations. In one exemplary operation, the operator may depress a throttle pedal of the machine 18. Operation of the throttle pedal in this way may, for example, accelerate the machine 18 in a reverse direction away from a pile of material. While depressing the throttle pedal, the operator may substantially simultaneously manipulate another operator interface 19 to, for example, raise a bucket of the machine 18 that has been loaded with material from the pile. In such an operation, the operator interfaces 19 and/or sensors associated therewith, may send signals to the control system 24 corresponding to the action desired by the operator. Such signals may be indicative of, for example, the respective torque demand of these parasitic loads 22. It is understood that such signals may be received by, for example, the machine controller 8 and/or other components of the control system 24 at Step: 102.

At Step: 104, the control system 24 may determine whether the received torque demand exceeds a maximum power source torque. For example, if a single torque demand is received from a parasitic load 22 receiving power from the power source 17, the control system 24 may compare the torque demand to a maximum power source torque at Step: 104, and may determine if the torque demand exceeds the maximum power source torque. In exemplary embodiments, the maximum power source torque may be stored in a memory of the machine controller 8 and/or may be retrievable using one or more look-up tables associated with the machine controller 8. If, on the other hand, more than one torque demand is received, the control system 24 may determine a cumulative torque demand at Step: 102, and may determine whether the cumulative torque demand exceeds the maximum power source torque at Step: 104. As described above, such a cumulative torque demand may be determined by, for example, summing the respective torque demands and/or by entering the individual torque demands into one or more cumulative torque demand algorithms employed by the machine controller 8. In exemplary embodiments, one or more of the operating characteristics and/or machine parameters described herein may also be inputted into such algorithms, and the torque demand may be determined by the control system 24 based on such inputs.

If the torque demand does not exceed the maximum power source torque (Step: 104—No), the control system 24 may determine that the power source 17 is capable of fully satisfying the torque demand of the one or more parasitic loads 22. In this situation, control may proceed to Step: 106 and torque may be provided to the one or more parasitic loads 22 based on the respective torque demands. For example, at Step: 106 the machine controller 8 may direct the power source 17 to provide torque to the transmission 11, and/or to the one or more parasitic loads 22 directly, in an amount corresponding to the torque demand. For example, at Step: 106, the machine controller 8 may direct the power source 17 to generate an output corresponding to, related to, and/or as a function of the torque demand received and/or determined at Step: 102. In exemplary embodiments, the machine controller 8 may direct the power source 17 to generate an output substantially equal to the torque demand. For example, the power source 17 may rotate the countershaft 10 at a speed enabling the countershaft 10 to deliver an output torque to the transmission 11 that is substantially equal to the torque demand. In such exemplary embodiments, the output torque delivered to the transmission 11 by the countershaft 10 may be equal to the torque demand. Alternatively, and/or in addition, the output generated by the power source 17 may be distributed between the parasitic loads 22 receiving power from the power source 17 directly (such as the one or more hydraulic pumps and/or hydraulic cylinders associated with the bucket) and the parasitic loads 22 receiving power from the power source 17 via the transmission 11 (such as the traction devices). The rotation of the countershaft 10 and/or other output of the power source 17 may have the effect of increasing or decreasing a speed of the power source 17. In addition, the rotation of the countershaft 10 and/or other output of the power source 17 may have the effect of increasing or decreasing the travel speed of the machine.

Alternatively, if the control system 24 determines that the torque demand exceeds the maximum power source torque (Step: 104 —Yes), the power source 17 may not be capable of fully satisfying the torque demand. In such situations, the control system 24 may be configured to distribute and/or otherwise provide torque generated by the power source 17 to the one or more parasitic loads 22 based on respective torque priority values associated with the parasitic loads 22. For example, as control proceeds to Step: 108 the control system 24 may determine whether to adjust the torque priority values associated with the respective parasitic loads 22. In exemplary situations in which the operator of the machine 18 has not manually requested adjustment of one or more such torque priority values (Step: 108 —No), torque may be provided to the one or more parasitic loads 22 based on existing, preset, and/or previously selected torque priority values (Step: 110). For example, if the operator has not manually changed a torque priority value associated with a parasitic load 22 via an associated operator interface 19, the machine controller 8 may direct the power source 17 and/or the transmission 11 to provide the torque generated by the power source 17 based on preset, and/or previously selected torque priority values. Such values may correspond to a previous operation in which the same operator manually adjusted the torque priority values based on his or her unique preferences. It is understood that the control system 24 may store such torque priority values in memory for future use during operations in which the torque demand exceeds the maximum power source torque.

Alternatively, in exemplary situations in which the operator of the machine 18 has manually requested adjustment of one or more torque priority values (Step: 108—Yes), torque may be provided to the one or more parasitic loads 22 based on such adjusted torque priority values (Step: 112). For example, if the operator has manually adjusted a torque priority value associated with a parasitic load 22 via an associated operator interface 19, the machine controller 8 may direct the power source 17 and/or the transmission 11 to provide the torque generated by the power source 17 based on the adjusted torque priority value. For example, during situations in which the operator has emptied a bucket of material at a drop location and is returning to the material pile to reload the bucket, the operator may wish to increase the torque priority value of the traction devices relative to the other parasitic loads 22 to enable a quicker return to the pile. The operator may, for example, manually enter one or more desired adjustments to the torque priority values using a keypad, touch screen, knob, and/or other operator interface 19 described herein. It is understood that such operator interfaces 19 may facilitate manual adjustments to more than one such torque priority value, and that such adjustments may occur substantially simultaneously.

Upon providing torque at Steps: 106, 110, or 112, control may return to Step: 102, in a closed-loop manner, where one or more additional torque demands associated with the parasitic loads 22 may be received and/or determined. Such closed-loop control may continue until, for example, continued machine operation is no longer required.

Enabling manual adjustments to the torque priority values, as described above, may be desirable in any application in which the machine 18 is used to, for example, transport material between two locations. The systems and methods described herein may be particularly advantageous in operations in which the pile of material is located a significant distance away from the drop location. As a result of such manual control and/or adjustment of the respective torque priority values, torque distribution between the parasitic loads 22 may be optimized during machine operation. In particular, due to such methods, torque may be distributed in accordance with static and/or dynamic operator preferences. Such control may result in a more user-friendly experience for the operator and an improved operational efficiency of the machine 18.

Additionally, the systems and methods described herein may be advantageous over known systems and control methods since such known systems and methods distribute torque between the various parasitic loads based on preset torque priority values. Such known systems and methods do not allow the operator to adjust control of the machine, based on his or her preferences, during operation of the machine. As a result, the operator may not be able to manually optimize operation of the corresponding parasitic loads while performing various operations.

Other exemplary embodiments of the present disclosure will be apparent to those skilled in the art from consideration of the specification, and practice of the systems and methods disclosed herein. It is intended that the specification and examples be considered as exemplary only, with a true scope of the invention being indicated by the following claims.

What is claimed is:

1. A method of controlling a machine, comprising:
receiving a torque demand associated with at least one of a first parasitic load and a second parasitic load, at least the first parasitic load receiving power from a power source of the machine via a transmission coupled to the power source; and
providing torque from the power source to the first and second parasitic loads in response to receiving the torque demand,
wherein torque is provided to the first and second parasitic loads based on a torque priority value associated with the at least one of the first and second parasitic loads,
wherein the torque priority value is adjustable by an operator of the machine during operation of the machine, and
wherein torque is provided to the first and second parasitic loads based on the torque priority value before and after adjustment of the torque priority value.

2. The method of claim 1, further including manually adjusting the torque priority value during operation of the machine, and providing torque from the power source to the first and second parasitic loads based on the adjusted torque priority value.

3. The method of claim 1, wherein the first parasitic load comprises a traction device of the machine and the second parasitic load comprises a hydraulic implement of the machine.

4. The method of claim 1, further including receiving an input from an operator of the machine, during operation of the machine, indicative of the torque priority value.

5. The method of claim 4, wherein the input is received via an operator interface of the machine, the input being indicative of a ratio between a first torque priority value associated with the first parasitic load and a second torque priority value associated with the second parasitic load.

6. The method of claim 1, wherein the torque priority value is adjustable within a priority value range, the priority value range comprising between approximately 30 percent of a maximum power source torque and approximately 70 percent of the maximum power source torque.

7. The method of claim 1, wherein adjusting the torque priority value associated with the at least one of the first and second parasitic loads changes a torque priority value associated with the other of the first and second parasitic loads.

8. The method of claim 1, wherein the torque demand comprises a cumulative torque demand indicative of torque substantially simultaneously required by the first and second parasitic loads.

9. The method of claim 8, further including determining that the cumulative torque demand exceeds a maximum power source torque, and providing torque from the power source to the at least one parasitic load, based on the torque priority value, in response to the determination.

10. A method of controlling a machine, comprising:
- determining a first cumulative torque demand associated with a traction device of the machine and an implement of the machine;
- determining that the first cumulative torque demand exceeds a maximum power source torque;
- providing torque from a power source of the machine to the traction device and the implement in response to determining that the first cumulative torque demand exceeds the maximum power source torque,
  - wherein torque is provided to the traction device and the implement based on a first torque priority value associated with the traction device and a second torque priority value associated with the implement;
- adjusting at least one of the first and second torque priority values based on an input received from an operator of the machine; and
- providing torque from the power source to the traction device and the implement based on the adjusted at least one of the first and second torque priority values.

11. The method of claim 10, further including determining a second cumulative torque demand associated with the traction device and the implement,
- determining that the second cumulative torque demand exceeds the maximum power source torque, and
- providing torque from the power source to the traction device and the implement based on the adjusted at least one of the first and second torque priority values in response to determining that the second cumulative torque demand exceeds the maximum power source torque.

12. The method of claim 10, further including adjusting the first and second torque priority values based on the input, wherein the first and second torque priority values are indicative of respective percentages of the maximum power source torque.

13. The method of claim 10, wherein the first cumulative torque demand is indicative of torque substantially simultaneously required by the traction device and the implement.

14. The method of claim 10, wherein the at least one torque priority value is adjustable within a priority value range, the priority value range comprising between approximately 30 percent of the maximum power source torque and approximately 70 percent of the maximum power source torque.

15. The method of claim 10, wherein the input is received via an operator interface of the machine, the input being indicative of a ratio between the first torque value and the second torque priority value.

16. The method of claim 10, further including providing torque from the power source to the traction device via a continuously variable transmission coupled to the power source.

17. A machine, comprising:
- a power source;
- a transmission operably connected to the power source;
- first and second parasitic loads receiving power from the power source, at least the first parasitic load receiving power from the power source via the transmission;
- an operator interface associated with the first and second parasitic loads; and
- a control system in communication with the power source, the transmission, the first and second parasitic loads, and the operator interface, wherein the control system is operable to
- receive a torque demand associated with at least one of the first and second parasitic loads,
- receive an input from the operator interface indicative of a torque priority value associated with the at least one of the first and second parasitic loads, and
- direct the power source to provide torque to the first and second parasitic loads in response to receiving the torque demand, wherein torque is provided to the first and second parasitic loads based on the torque priority value, and
  - wherein the torque priority value is adjustable by an operator, and wherein torque may be provided to the first and second parasitic loads based on the torque priority value before and after adjustment of the torque priority value.

18. The machine of claim 17, wherein the first parasitic load comprises a traction device of the machine, the second parasitic load comprises a hydraulic implement of the machine, the power source comprises a diesel engine, and the transmission comprises a continuously variable transmission.

19. The machine of claim 17, wherein the operator interface is operable to control a ratio between a first torque priority value associated with the first parasitic load and a second torque priority value associated with the second parasitic load.

20. The machine of claim 19, wherein the operator interface is configured to adjust the torque priority value within a priority value range, the priority value range comprising between approximately 30 percent of a maximum power source torque and approximately 70 percent of the maximum power source torque.

* * * * *